US012665366B2

(12) United States Patent
    Simonin

(10) Patent No.: US 12,665,366 B2
(45) Date of Patent: Jun. 23, 2026

(54) GROUNDING BRUSH ASSEMBLY

(71) Applicant: AKTIEBOLAGET SKF, Gothenburg (SE)

(72) Inventor: Anthony Simonin, Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 226 days.

(21) Appl. No.: 18/745,030

(22) Filed: Jun. 17, 2024

(65) Prior Publication Data
    US 2025/0007228 A1     Jan. 2, 2025

(30) Foreign Application Priority Data
    Jun. 30, 2023  (FR) ...................................... 2306927

(51) Int. Cl.
    H01R 39/39         (2006.01)
    H02K 11/40         (2016.01)

(52) U.S. Cl.
    CPC ............. H01R 39/39 (2013.01); H02K 11/40 (2016.01)

(58) Field of Classification Search
    CPC .......... H02K 5/14; H02K 5/145; H02K 5/161; H02K 5/15; H02K 5/16; H02K 5/163; H02K 5/165; H02K 5/132; H02K 5/24; H02K 11/40; H02K 11/00; H02K 11/026; H02K 11/028; H02K 13/00; F16C 41/002; F16C 19/52; F16C 2380/26; H01R 39/39; H01R 39/24; H01R 4/64; H01R 39/38; H01R 39/385; H01R 39/64; H01R 2201/10; F05F 3/02
    USPC ........................................................ 310/239
    See application file for complete search history.

(56) References Cited

U.S. PATENT DOCUMENTS

| | | | | |
|---|---|---|---|---|
| 3,564,477 A | * | 2/1971 | Pompei ................ | H01R 39/643 439/271 |
| 3,757,164 A | * | 9/1973 | Binkowski ................ | H05F 3/02 361/221 |
| 4,521,708 A | * | 6/1985 | Vandevier .............. | H02K 5/167 310/90 |

(Continued)

FOREIGN PATENT DOCUMENTS

| | | |
|---|---|---|
| DE | 102021213639 A1 | 6/2023 |
| FR | 3110650 A1 | 11/2021 |

(Continued)

OTHER PUBLICATIONS

Preliminary Search Report from the French Patent Office dated Feb. 1, 2024 in related French application No. FR2306927, including Search Report and Written Opinion.

*Primary Examiner* — Maged M Almawri
(74) *Attorney, Agent, or Firm* — J-TEK LAW PLLC; Scott T. Wakeman; Mark A. Ussai

(57)                ABSTRACT

A grounding brush assembly includes a brush and a mounting plate, the brush including a plurality of conductive fibers and a support inside of which the conductive fibers are housed. The support includes a mounting portion, first and second lateral rims axially gripping the conductive fibers, and at least one tab distinct from the first and second lateral rims and bearing axially against the mounting plate. The grounding brush assembly further includes at least one connector for rigidly securing the tab to the mounting plate, the connector being distinct from the support and from the mounting plate.

12 Claims, 7 Drawing Sheets

(56) References Cited

U.S. PATENT DOCUMENTS

| | | | | |
|---|---|---|---|---|
| 5,961,222 A * | 10/1999 | Yabe | | F16C 33/586 |
| | | | | 384/477 |
| 6,686,673 B1 * | 2/2004 | Komura | | H02K 11/40 |
| | | | | 310/90 |
| 7,528,513 B2 * | 5/2009 | Oh | | H02K 11/40 |
| | | | | 310/88 |
| 8,567,042 B2 * | 10/2013 | Neuroth | | H02K 5/16 |
| | | | | 29/598 |
| 10,253,818 B1 * | 4/2019 | Ince | | F16C 33/7843 |
| 10,931,179 B2 * | 2/2021 | Hubert | | H01R 39/39 |
| 11,204,066 B2 * | 12/2021 | Feliciano | | F16C 37/007 |
| 11,309,775 B2 * | 4/2022 | Hubert | | H02K 11/40 |
| 11,549,556 B2 * | 1/2023 | Berruet | | F16C 19/52 |
| 11,773,908 B1 * | 10/2023 | Kovacs | | F16C 19/14 |
| | | | | 384/513 |
| 11,885,377 B2 * | 1/2024 | Kovacs | | F16C 33/583 |
| 2004/0233592 A1 * | 11/2004 | Oh | | H02K 11/40 |
| | | | | 361/23 |
| 2014/0064651 A1 * | 3/2014 | Beyfuss | | F16C 35/067 |
| | | | | 384/535 |
| 2015/0256054 A1 * | 9/2015 | Northwall | | H02K 11/40 |
| | | | | 310/68 C |
| 2016/0111941 A1 * | 4/2016 | Sturm | | H02K 11/40 |
| | | | | 310/68 R |
| 2019/0123609 A1 * | 4/2019 | Wilcox | | F04D 13/08 |
| 2021/0021180 A1 | 1/2021 | Hubert et al. | | |
| 2021/0044178 A1 * | 2/2021 | Weber | | H02K 11/40 |
| 2021/0310517 A1 * | 10/2021 | Berruet | | H01R 39/39 |
| 2021/0310518 A1 * | 10/2021 | Berruet | | F16C 41/002 |
| 2021/0310520 A1 * | 10/2021 | Arnault | | F16C 35/077 |
| 2021/0364040 A1 * | 11/2021 | Arnault | | F16C 41/002 |
| 2021/0364041 A1 * | 11/2021 | Berruet | | F16C 19/52 |
| 2022/0294319 A1 | 9/2022 | Arnault et al. | | |
| 2023/0170658 A1 | 6/2023 | Viault | | |
| 2023/0223813 A1 * | 7/2023 | Arnault | | F16C 35/077 |
| | | | | 310/89 |

FOREIGN PATENT DOCUMENTS

| | | | |
|---|---|---|---|
| FR | 3110651 A1 | 11/2021 | |
| FR | 3120754 A1 | 9/2022 | |

* cited by examiner

GROUNDING BRUSH ASSEMBLY

CROSS-REFERENCE

This application claims priority to French patent application no. 2306927 filed on Jun. 30, 2023, the contents of which are fully incorporated herein by reference.

BACKGROUND OF THE INVENTION

The present invention relates to the field of grounding devices for controlling the shaft voltage generated in electric motors or machines, and in particular grounding brush assemblies.

In an electric motor or machine, at least one rolling bearing is mounted between the casing of the electric motor or machine and the rotary shaft in order to support the shaft.

As the shaft rotates during machine operation, a difference in electrical potential may arise between the shaft and the casing of the electric motor or machine, which may generate an electric current between the inner ring of the rolling bearing, which is rigidly secured to the shaft, and the bearing outer ring, which is rigidly secured to the casing.

Electrical current passing through the components of the rolling bearing can damage these components, in particular the rolling elements and the raceways formed on the inner and outer rings. Electrical discharges can also generate vibration.

To overcome these drawbacks, it is a known practice to ground or earth the rotary shaft using a grounding brush including conductive fibers. The grounding brush is usually mounted in the bore of the casing of the electric motor such that the free ends of the fibers are in radial contact with the outer surface of the rotary shaft.

Due to the electrical conductivity of the fibers, the brush is maintained at the same electrical potential as the casing of the electric motor. The inner and outer rings of the rolling bearing are also at the same electrical potential, which reduces or even eliminates problematic electrical discharges through the rolling bearing.

US Patent Publication No. 2021/0021180 A1 discloses a grounding brush assembly including a grounding brush provided with a support and a plurality of conductive fibers mounted in the support, and an annular mounting plate having a plurality of tabs for radial and axial retention of the support of the grounding brush and an annular outer flange radially surrounding the brush and the tabs. The tabs are formed by plastic deformation of the mounting plate.

SUMMARY OF THE INVENTION

The present invention aims to provide an alternative structure or device for attaching a grounding brush to a mounting plate.

The present invention relates to a grounding brush assembly comprising a grounding brush and a brush mounting plate, the brush being provided with a plurality of conductive fibers and with a support inside which the conductive fibers are housed.

The support includes a mounting portion, a first lateral rim extending from one axial side of the mounting portion and a second lateral rim extending from another, opposing axial end of the mounting portion, the first and second lateral rims axially gripping the conductive fibers.

According to a general feature of the invention, the support of the brush includes at least one tab distinct from the first and second lateral rims and bearing axially against the mounting plate, the assembly further comprising at least one securing means or connector for rigidly securing the tab to the mounting plate, the securing means/connector being distinct from the support and from the mounting plate.

Thus, the brush and the mounting plate are rigidly secured together, axially and radially, simply and inexpensively by virtue of the tab or tabs of the support of the brush and by virtue of the one or more securing means or connector(s) for rigidly securing the tab to the mounting plate.

The mounting plate may be provided with a main body. The mounting plate may be provided with at least one centering portion extending the main body at least axially, which is offset radially outwardly with respect to the support and has an outer surface defining an outside diameter of the mounting plate.

The at least one tab of the support may bear axially against the main body of the mounting plate.

According to a first design, the one or more tabs of the support of the brush bears axially directly against the mounting plate.

According to a second alternative design, the securing means or connector is interposed axially between the mounting plate and the tab of the support. The tab of the support bears axially indirectly against the mounting plate with the axial interposition of the securing means.

The tab of the support of the brush may extend from the mounting portion of the support of the brush.

The tab of the support of the brush may extend from the first lateral rim of the support of the brush.

The securing means/connector may be electrically conductive.

The securing means or connector may be made of an electrically conductive material.

The first lateral rim of the support may be in axial contact with the mounting plate.

The securing means/connector may comprise glue and/or an adhesive and/or a weld and/or a braze.

The support of the brush may comprise a plurality of tabs bearing axially against the mounting plate and spaced apart from one another in the circumferential direction regularly or irregularly.

The assembly may comprise a plurality of securing means or connector for rigidly securing the tabs to the mounting plate, which may or may not each be electrically conductive. The securing means may be identical or different from each.

The present invention also relates to an electric motor comprising a casing, a shaft and a grounding brush assembly as defined above and mounted radially between the casing and the shaft, the conductive fibers of the assembly being in contact with the shaft, the mounting plate being in radial contact with the bore of the casing.

The present invention also relates to a method for assembling a grounding brush assembly as defined above comprising the following steps:

- a step of forming the tab of the support by partially cutting the support of the brush and by bending;
- a positioning step in which the grounding brush is brought axially against the mounting plate; and
- an assembly step in which the tab of the support is rigidly secured to the mounting plate using the securing means/connector(s).

BRIEF DESCRIPTION OF THE SEVERAL VIEWS OF THE DRAWINGS

The present invention will be understood more clearly on reading the detailed description of embodiments, provided by way of non-limiting examples and illustrated by the attached drawings in which.

DETAILED DESCRIPTION OF THE INVENTION

Figure 1:
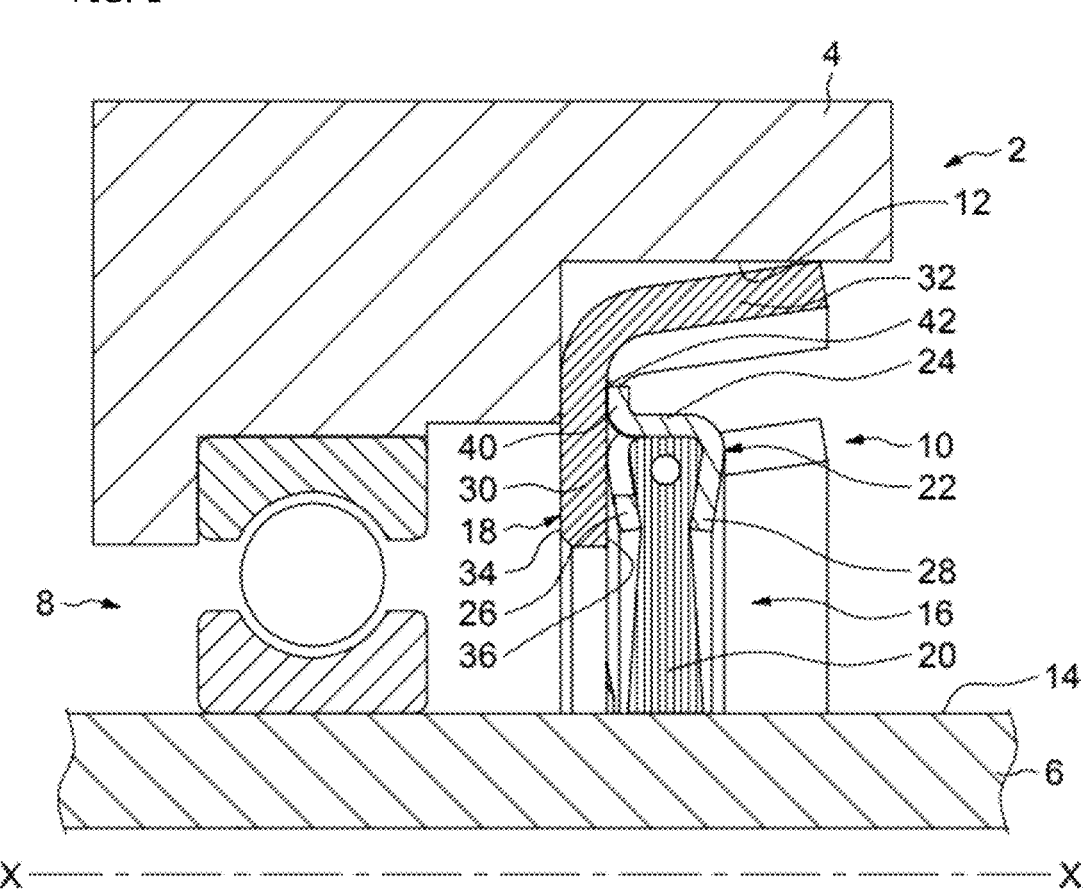
FIG. 1 is a view in axial cross section of a grounding brush assembly mounted radially between a rotary shaft and a casing of an electric motor according to a first exemplary embodiment of the invention.

FIG. 1 shows, in axial cross section, part of an electric motor or machine 2 comprising a fixed casing 4, a shaft 6, specifically a rotary shaft, of axis X-X, supported radially by a bearing 8. The bearing 8 is for example a rolling bearing such as a ball bearing. In a variant, it is possible to envisage other rolling elements, for example rollers. In another variant, it is also possible to envisage a plain bearing.

The motor 2 comprises a grounding brush assembly 10 mounted radially between the bore 12 of the casing 4 and the cylindrical outer surface of the shaft 14. The grounding brush assembly 10 is, for example, force-fitted within the bore of the casing 12.

Figure 2:
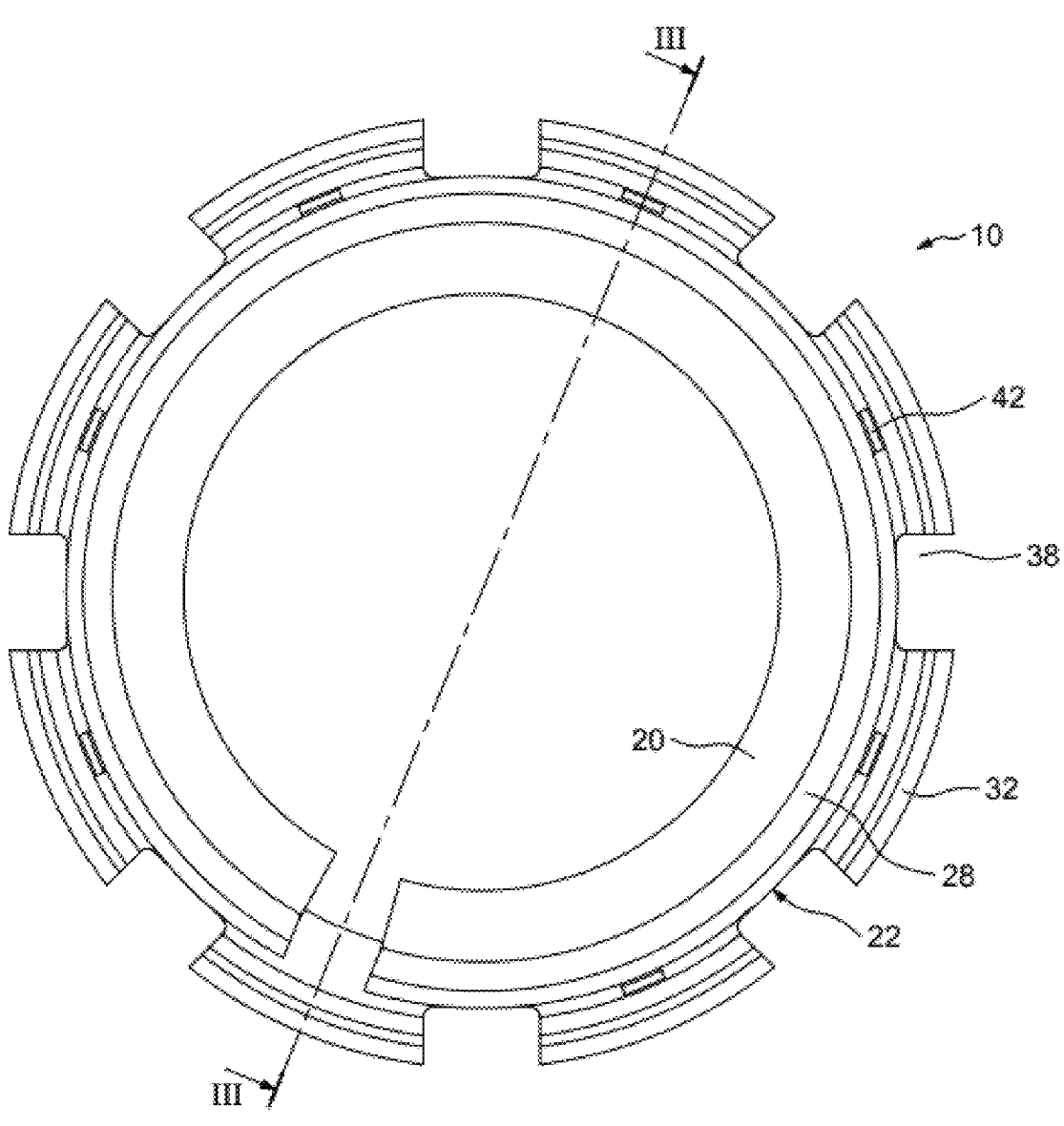
FIG. 2 is an end-on view of the grounding brush assembly of FIG. 1.
Figure 3:
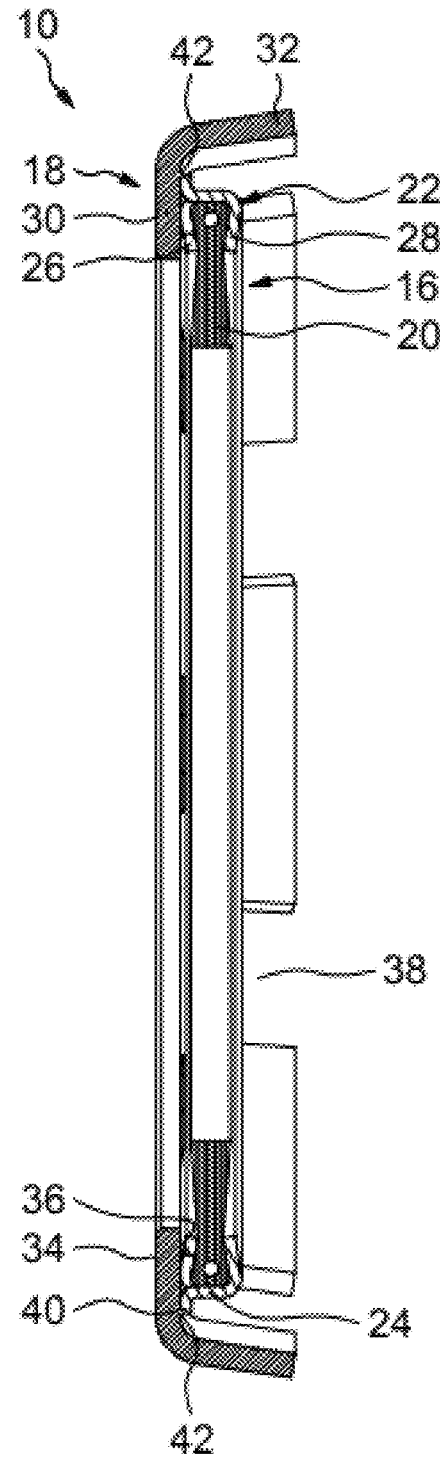
FIG. 3 is a view in cross section of the assembly of FIG. 2 along the axis III-III.

As shown more clearly in FIGS. 2 and 3, the assembly 10 has a generally annular shape.

The grounding brush assembly 10 comprises a grounding brush 16 and a brush mounting plate 18. The brush 16 includes a support 22 and a plurality of conductive fibers 20 disposed at least partially within the support 22, i.e., the conductive fibers 20 are housed inside the support 22 of the brush 16. The conductive fibers 20 are made of an electrically conductive material, such as for example, carbon, stainless steel, a conductive plastic such as acrylic or nylon fibers or any other appropriate materials. The plurality of conductive fibers 20 preferably takes the form of an open ring. In the example shown, the conductive fibers 20 are bent around a connecting wire (not indicated). The free, distal radial end of each of the conductive fibers 20 is in radial contact with the cylindrical outer surface of the shaft 14.

To ensure the mounting and retention of the conductive fibers 20, the support 22 of the brush 16 includes a mounting portion 24, a first lateral rim 26 extending from one axial side of the mounting portion 24 and a second lateral rim 28 extending from another, opposing axial end of the mounting portion 24.

The mounting portion 24 extends from a large-diameter edge of the first lateral rim 26 and the first lateral rim 26 extends radially inwardly from the mounting portion 24. Similarly, the mounting portion 24 extends from a large-diameter edge of the second lateral rim 28 and the second lateral rim 28 extends radially inwardly from the mounting portion 24. The second lateral rim 28 extends from the mounting portion 24 on the side opposite to the first lateral rim 26.

Preferably, the mounting portion 24 extends substantially axially, but the mounting portion 24 may alternatively extend obliquely.

The mounting portion 24 and the first and second lateral rims 26, 28 are of generally annular shape and delimit a channel (not indicated) that is open radially inward, inside of which an outer radial end of each of the conductive fibers 20 is located. The first and second lateral rims 26, 28 axially grip the conductive fibers 20, such that the conductive fibers 20 bear axially on either side against the first and second lateral rims 26, 28.

In the depicted exemplary embodiment, the conductive fibers 20 come to bear radially against the mounting portion 24, the first and second lateral rims 26, 28 extending obliquely inwardly from the mounting portion 24 so as to be generally converging toward each other. In a variant, the first and second lateral rims 26, 28 could extend substantially radially.

As will be described in more detail below, the support 22 of the brush 16 further includes a plurality of tabs 40 for rigidly securing the support 22 to the mounting plate 18.

The mounting plate 18 includes an annular main body 30 bearing axially against the first lateral rim 26 of the support 22 of the brush 16 and a plurality of centering portions 32 extending obliquely outwardly from a large-diameter edge of the main body 30.

The main body 30 of the mounting plate 18 has two opposite end faces 34, 36 which delimit an axial thickness of the main body 30 of the mounting plate 18. The first lateral rim 26 of the support of the brush bears axially against the end face 36 of the main body 30.

The centering portions 32 of the mounting plate 18 are spaced apart from one another in the circumferential direction of the grounding brush assembly 10, such that a plurality of notches 38 are defined circumferentially between each two consecutive centering portions 32. The centering portions 32 are formed, for example, by cutting an annular portion of the mounting plate 18 in such a manner as to form the notches 38, thereby defining one centering portion 32 between each pair of adjacent notches 38.

The centering portions 32 define an outside diameter of the mounting plate 18. Specifically, the outer surfaces of the centering portions 32 define the outside diameter of the mounting plate 18. The centering portions 32 enable centering of the mounting plate 18 after mounting in the assembly 10 within the bore 12 of the casing 4 of the associated electric motor 2.

Preferably, each centering portion 32 extends obliquely outwardly, surrounding at least locally and being spaced radially outwardly from the mounting portion 24 of the support 22 of the brush 16. Alternatively, each centering portion 32 may extend entirely axially. In another variant, each centering portion 32 may extend in an axial direction opposite to, or axially away from, the support 22 of the brush 16.

As stated above, the support 22 of the brush 16 further comprises the plurality of tabs 40. Each tab 40 of the support 22 extends radially outwardly from the mounting portion 24 of the support 22 of the brush 16. Specifically, each tab 40 extends from the mounting portion 24 of the support 22 on the side opposite to the second lateral rim 28 of the support 22. Each tab 40 extends in the radial extension of the first lateral rim 26. Further, each tab 40 of the support 22 extends substantially parallel to the main body 30 of the mounting plate 18.

Each tab 40 of the support 22 bears axially against the mounting plate 18. More specifically, each tab 40 of the support 22 bears axially against the end face 36 of the main body 30 of the mounting plate 18.

In the example shown, each tab 40 of the support 22 is arranged so as to extend toward one of the centering portions 32 of the mounting plate 18, a free end (not indicated) of each tab 40 being radially spaced inwardly from the centering portion 32. Alternatively, all or some of the tabs 40 of the support 22 may extend radially toward one of the notches 38 of the mounting plate 18. In a variant, all or some of the tabs 40 of the support 22 may extend against a centering portion 32 of the mounting plate 18.

The tabs 40 are offset from one another in the circumferential direction of the grounding brush assembly 10, in this case regularly or evenly. In the depicted exemplary embodiment, the support 22 has eight tabs 40. Alternatively, the support 22 may have a different number of tabs 40, for example more than eight tabs 40 or fewer than eight tabs 40.

Figure 4:
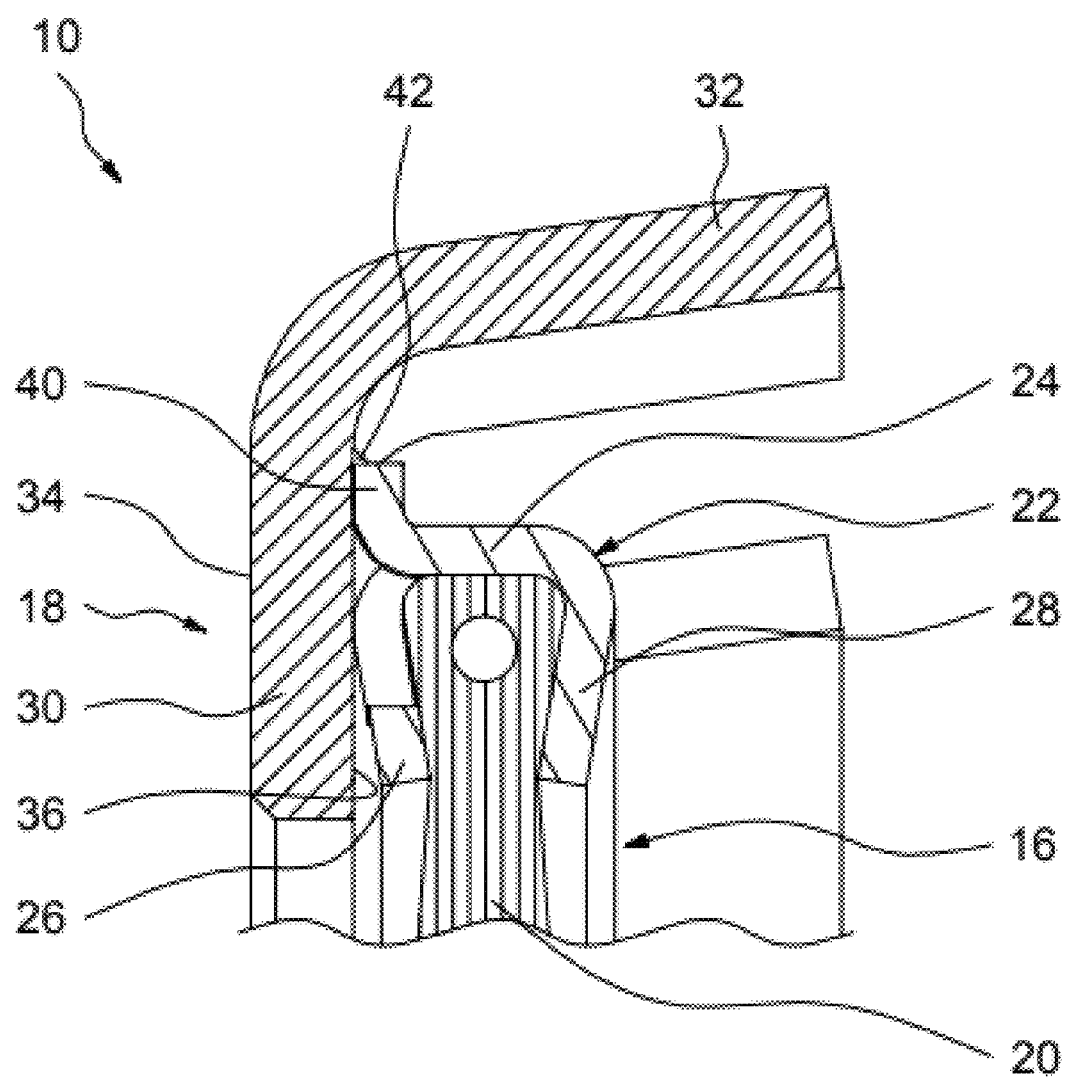
FIG. 4 is a detail view of FIG. 3.

As shown in FIG. 4, the grounding brush assembly 10 further comprises at least one securing means 42, also referred to as a "connector" 42, associated with the at least one tab 40 of the support 22 for rigidly securing the tab 40 to the mounting plate 18. Preferably, the assembly 10 includes a plurality of securing means/connectors 42 each associated with a separate one of the preferred plurality of tabs 40, such that the number of securing means/connectors 42 is therefore equal to the number of tabs 40.

The securing means 42 are elements distinct from, and added to, the support 22 and from the mounting plate 18.

In the exemplary embodiment illustrated, each securing means or connector 42 is provided between a free end edge of the associated tab 40 and the end face 36 of the main body 30 of the mounting plate 18. The securing means/connector 42 covers the free end edge of the associated tab 40 and covers locally the end face 36 of the main body 30 of the mounting plate 18. In the depicted embodiment, each securing means 42 is a weld and each tab 40 of the support 22 bears directly against the mounting plate 18, and is thereby being welded to the main body 30 of the mounting plate 18 by the securing means/connector 42.

Alternatively, the securing means 42 may include at least one of the following: a glue, an adhesive or a braze. In this case, the tab 40 of the support 22 bears indirectly against the mounting plate 18, the securing means/connector 42 being interposed axially between the mounting plate 18 and each tab 40 of the support 22.

In the example shown, each tab 40 of the support 22 extends substantially radially. Alternatively, all or some of the tabs 40 of the support 22 may extend obliquely.

In the example shown, the support 22 of the brush 16 is made in one piece. Alternatively, the tabs 40 of the support 22 may be distinct parts formed separately from a remainder of the support 22 and attached to the support 22 by any appropriate means, for example by welding or adhesive bonding.

The mounting plate 18 and the support 22 of the brush 16 are formed as two separate parts. The mounting plate 18 and the grounding brush 16 are each preferably formed of an electrically conductive material, for example aluminum, stainless steel, bronze, copper or another appropriate material.

Preferably, each securing means/connector 42 is also made of an electrically conductive material so as to further promote the dissipation of the electrical charges. Thus, any electrical charges that build up on the shaft 6 during the operation of the electric machine 2 are dissipated towards the casing 4 through the conductive fibers 20, the support 22 of the brush 16, the securing means 42 and the mounting plate 18. It is however possible to provide for the securing means 42 to be made of an electrically non-conductive material.

In the example shown, the mounting plate 18 comprises a plurality of centering portions 32 spaced apart regularly or evenly in the circumferential direction of the assembly 10. In a variant, the mounting plate 18 may comprise a plurality of centering portions 32 spaced apart irregularly/unevenly in the circumferential direction of the assembly 10.

In another variant, the mounting plate 18 may include only a single annular centering portion 32 formed as a flange.

In the example shown, the support 22 of the brush 16 includes a plurality of tabs 40 spaced apart regularly in the circumferential direction of the assembly 10. Alternatively, the support 22 of the brush 16 may comprise a plurality of tabs 40 spaced apart irregularly or unevenly in the circumferential direction of the assembly 10. In a variant, the support 22 of the brush 16 include only a single tab 40.

Figure 5:
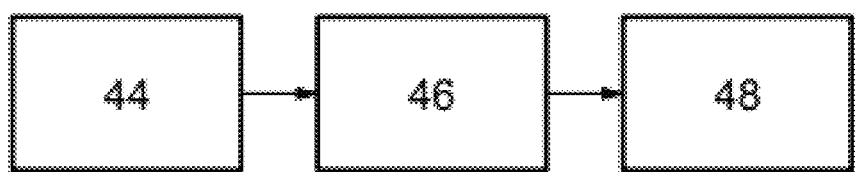
FIG. 5 schematically depicts a method for assembling the grounding brush assembly of FIGS. 1 to 4.

FIG. 5 schematically depicts a method for assembling the assembly 10.

It starts with a step 44 of forming the tabs 40 during which the first lateral rim 26 of the support 22 is cut and bent so as to form the tabs 40.

Next comes a positioning step 46 in which the support 22 of the brush 16 is brought axially into axial contact against the mounting plate 18. More specifically, the support 22 of the brush 16 is brought against the main body 30 of the mounting plate 18, the first lateral rim 26 of the support 22 and the tabs 40 bearing axially against the main body 30.

Then comes an assembly step 48 in which the tabs 40 of the support 22 are rigidly secured to the mounting plate 18 using the securing means/connector(s) 42.

Figure 6:
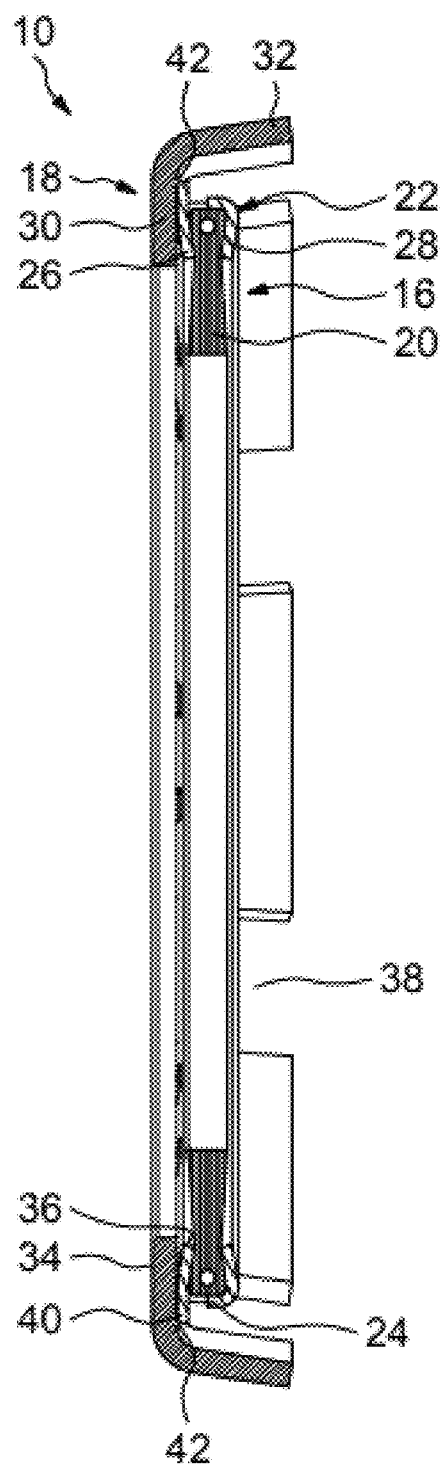
FIG. 6 is a view in cross section of a grounding brush assembly according to a second exemplary embodiment of the invention.
Figure 7:
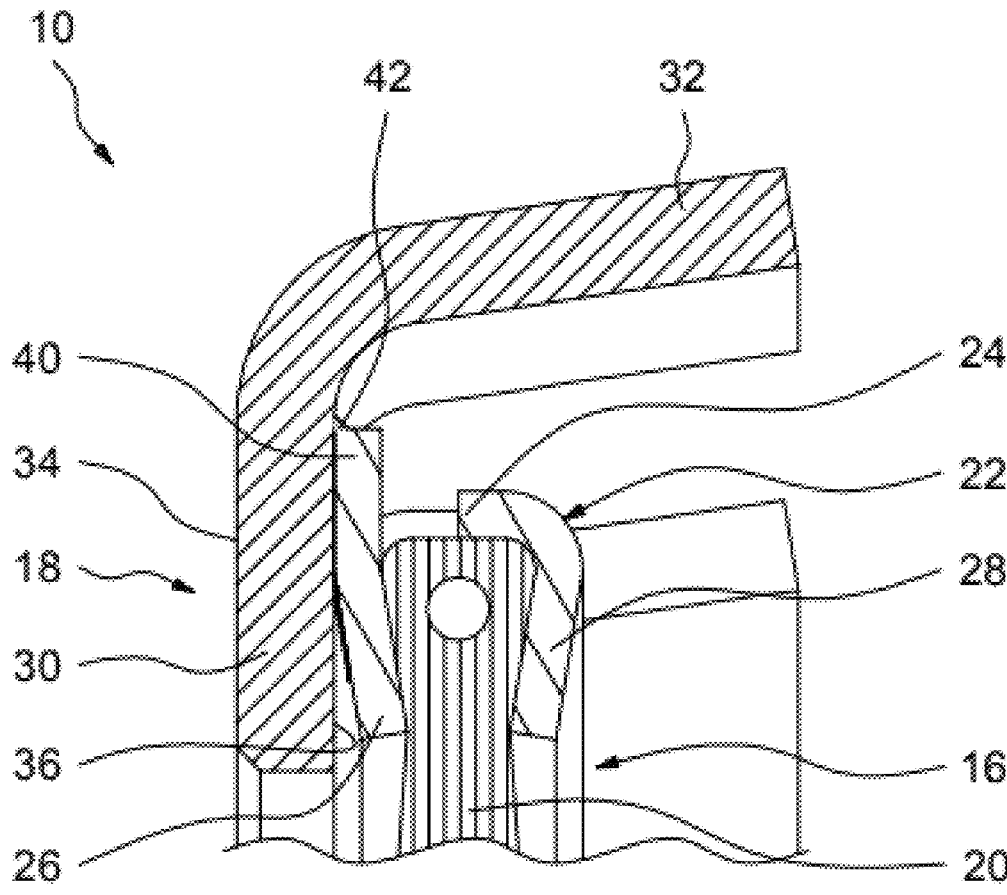
FIG. 7 is a detail view of FIG. 6.

In the exemplary embodiment described above, the tabs 40 of the support 22 of the brush 16 extend from the mounting portion 24 of the support 22. Alternatively, as shown in FIGS. 6 and 7, in which identical elements bear the same reference numbers, the tabs 40 of the support 22 of the brush 16 may extend from the first lateral rim 26 of the support 22. In this case, the tabs 40 extend from a large-diameter edge of the first lateral rim 26 of the support 22.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

I claim:

1. A grounding brush assembly comprising:
a grounding brush including a support and a plurality of conductive fibers disposed at least partially within the support, the support having a mounting portion, a first lateral rim extending from one axial side of the mounting portion and a second lateral rim extending from another axial side of the mounting portion, the first and second lateral rims axially gripping the conductive fibers; and
a brush mounting plate;
wherein the support of the brush includes at least one tab distinct from the first and second lateral rims and bearing axially against the mounting plate; and
wherein the grounding brush assembly further comprises at least one securing means for rigidly securing the at least one tab of the support to the mounting plate, the securing means being distinct from the support and from the mounting plate.

2. The grounding brush assembly according to claim 1, wherein the mounting plate includes a main body and at least one centering portion extending at least axially from the main body, the at least one centering portion being offset radially outwardly with respect to the support and having an outer surface defining an outside diameter of the mounting plate, the at least one tab of the support bearing axially against the main body of the mounting plate.

3. The grounding brush assembly according to claim 1, wherein one of:
the at least one tab of the support of the brush bears axially directly against the mounting plate; and
the at least one securing means is disposed axially between the least one tab of the support of the brush and the mounting plate such that the at least one tab bears axially indirectly against the mounting plate.

4. The grounding brush assembly according to claim 1, wherein the at least one tab of the support of the brush extends from the mounting portion of the support or extends from the first lateral rim of the support.

5. The grounding brush assembly according to claim 1, wherein the securing means is made of an electrically conductive material.

6. The grounding brush assembly according to claim 1, wherein the first lateral rim of the support is in axial contact with the mounting plate.

7. The grounding brush assembly according to claim 1, wherein the securing means include at least one of glue, an adhesive, a weld and a braze.

8. The grounding brush assembly according to claim 1, wherein:
the support of the brush includes a plurality of tabs bearing axially against the mounting plate and spaced apart from one another in the circumferential direction; and
the grounding brush assembly further comprises a plurality of securing means each rigidly securing a separate one of the plurality of tabs to the mounting plate.

9. An electric motor comprising:
a casing having a bore;
a shaft; and
a grounding brush assembly according to claim 1 mounted radially between the casing and the shaft, the conductive fibers of the grounding brush assembly being in contact with the shaft and the mounting plate being in radial contact with the bore of the casing.

10. A method for assembling a grounding brush assembly according to claim 1, comprising the steps of:
forming the at least one tab of the support by partially cutting the support of the brush and bending a portion of the cut support;
positioning the grounding brush axially against the mounting plate; and
assembling the grounding brush and the mounting plate by rigidly securing the at least one tab of the support to the mounting plate using the securing means.

11. A grounding brush assembly comprising:
a grounding brush including a support and a plurality of conductive fibers disposed at least partially within the support, the support having a mounting portion, a first lateral rim extending from one axial side of the mounting portion and a second lateral rim extending from another axial side of the mounting portion, the first and second lateral rims axially gripping the conductive fibers; and
a brush mounting plate;
wherein the support of the brush includes at least one tab distinct from the first and second lateral rims and bearing axially against the mounting plate; and
wherein the grounding brush assembly further comprises at least connector rigidly securing the at least one tab of the support to the mounting plate, the at least one connector being distinct from the support and from the mounting plate.

12. The grounding brush assembly according to claim 11, wherein the at least one connector includes at least one of glue, an adhesive, a weld and a braze.

* * * * *